(12) United States Patent
Sommer

(10) Patent No.: US 6,357,314 B1
(45) Date of Patent: Mar. 19, 2002

(54) RACK-AND-PINION STEERING GEAR

(75) Inventor: Rudolf Sommer, Schwäbisch Gmünd (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/530,917

(22) PCT Filed: Nov. 2, 1998

(86) PCT No.: PCT/EP98/06931

§ 371 Date: Jun. 26, 2000

§ 102(e) Date: Jun. 26, 2000

(87) PCT Pub. No.: WO99/24306

PCT Pub. Date: May 20, 1999

(30) Foreign Application Priority Data

Nov. 7, 1997 (DE) ......................................... 197 49 274

(51) Int. Cl.⁷ ............................................... F16H 35/00
(52) U.S. Cl. ....................... 74/388 PS; 74/422; 180/427
(58) Field of Search ............................ 74/388 PS, 422, 74/498; 180/427

(56) References Cited

U.S. PATENT DOCUMENTS

| | | | |
|---|---|---|---|
| 3,585,875 A | * 6/1971 | Adams | 74/422 |
| 4,322,986 A | * 4/1982 | Adams et al. | 74/89.18 |
| 4,793,433 A | * 12/1988 | Emori et al. | 180/143 |
| 5,117,705 A | * 6/1992 | Guasch | 74/422 |
| 5,287,764 A | * 2/1994 | Beer | 74/498 |
| 6,119,540 A | * 9/2000 | Phillips | 74/422 |
| 6,142,031 A | * 11/2000 | Phillips | 74/422 |
| 6,178,843 B1 | * 1/2001 | Machida et al. | 74/498 |

* cited by examiner

*Primary Examiner*—David Fenstermacher
(74) *Attorney, Agent, or Firm*—Larson & Taylor PLC

(57) ABSTRACT

The rack-and-pinion steering gear, in particular for controlling motor vehicles, in order to compensate for the deviations in planarity between the thrust piece and the set screw, has a compensating disk acted upon by a spring on one side; the top side of the compensating disk is embodied spherically and engages the inside of a recess, adapted to it, of the thrust piece, and its underside is partly curved, so that the requisite variation in spacing between the thrust piece and the set screw that is required to compensate for toothing deviations is constantly spanned while maintaining a contact.

18 Claims, 4 Drawing Sheets

RACK-AND-PINION STEERING GEAR

FIELD OF THE INVENTION

The present invention relates to a rack-and-pinion steering gear, in particular for controlling motor vehicles, and in particular to a rack-and-pinion steering gear having a central compression spring which is braced on a set screw provided in a housing and which urges the rack in the direction of a pinion via a thrust piece.

BACKGROUND OF THE INVENTION

In conventional rack-and-pinion steering gears, it is usual for the rack with its teeth to be pressed constantly against the teeth of the pinion by a central compression spring and a thrust piece between them, and for the opposite side of the central compression spring to be braced on a set screw or on an element comparable to the set screw that assures a desired spacing in some other way than by means of a thread.

Between the plane contact sides of the thrust piece and set screw, an axial spacing must be provided that is at least equivalent to the thrust piece travel. The thrust piece travel is the change in spacing between the pinion and the rack as a consequence of their total toothing deviations, which are effective for spacing purposes during the actuation of the steering gear.

If a smaller thrust piece play is set with the set screw than would correspond to the thrust piece travel dictated by deviations, the steering gear can jam while being actuated.

On the other hand, in terms of the vehicle, as a rule only little thrust piece play is desired, so that bumps in the road will not cause irritating rattling noises in the rack-and-pinion steering gear.

When the steering force is introduced via the pinion, and also as a result of the restoring force from the vehicle chassis that acts on the rack and from bumps in the road while driving, the rack and thrust piece are pressed away from the pinion by the toothing engagement angle, until such time as the thrust piece contacts the set screw.

This kind of rack-and-pinion steering gear is known for instance from Published, Non-examined German Patent Application DE-OS 19 48 612. In it, the steering shaft, which is actuated from the steering wheel and is supported in a housing, has a steering pinion that engages a rack, which pinion is pressed against the rack by a bearing block indirectly by a compression spring by means of a slide supported in the housing. The bearing block rests with a cylindrical or spherical guide face on a corresponding bearing face on the slide. A compression spring that acts on the slide is braced in the housing on a set screw; to limit backward deflection of the slide and thus to assure an engagement between the rack and the steering pinion, the travel of the slide can be adjusted by a limiting ring.

The known rack-and-pinion steering gears, however, also have the disadvantage that deviations in planarity of the thrust piece and set screw can cause tilting of the thrust piece; that the thrust piece play that is actually present can be defined only with great difficult; and that bumps in the road can cause rattling noises even if the thrust piece play is only slight. Although these noises can be reduced by a stronger central compression spring, as a rule this makes the steering gear tighter.

BRIEF SUMMARY OF THE INVENTION

The object of the invention is to overcome these disadvantages and to create a rack-and-pinion steering gear in which the undesired rattling noises are reliably avoided, which runs smoothly, and in which tilting of the thrust piece no longer occurs.

This object is attained with the invention as described hereafter. In particular, the invention includes a compensating disk between the thrust piece and the set screw which is disposed with a topside toward the thrust piece. The compensating disk has a ball zone that engages the inside of a ball socket that is disposed on and adapted to the underside of the thrust piece.

The invention accordingly essentially provides the disposition of two additional parts, namely first a compensating disk between the thrust piece and set screw, and second, an eccentric spring between the compensating disk and set screw, along with an altered shape of the thrust piece; on the side toward the thrust piece, the compensating disk preferably has a spherical form and rests in a ball socket, adapted to it, of the thrust piece. The shape of the ball socket can be designed to suit the requirements in terms of function and load.

The invention offers the advantage that because it is possible to rotate the compensating disk in the ball socket in both planes, the deviations in planarity can be compensated for, and that the desired thrust piece play can be defined simply and without ambiguity, or adjusted with the set screw.

The side of the compensating disk toward the set screw, or the plane surface of the set screw as well, has a portion equivalent at most to half the side face and is embodied as curve-like, that is, is curved. The eccentric spring is seated in a bore of the compensating disk, and the bore is located on the non-curved or in other words flat portion of the plane surface. The eccentric spring has the effect that if the spacing between the set screw and the thrust piece increases, the compensating disk tilts. As a result, regardless of the axial position of the thrust piece, a bridge always exists between the thrust piece and the set screw. Instead of the typically provided thrust piece play, an adjustable thrust piece spacing is accordingly employed.

It should be emphasized that the surface curvature and the disposition of the eccentric spring can also be provided on the set screw, instead of on the compensating disk.

BRIEF DESCRIPTION OF THE DRAWINGS

The invention will be described in further detail below in conjunction with the drawing, in which advantageous exemplary embodiments are shown. Shown are.

DETAILED DESCRIPTION OF THE INVENTION

Figure 1:
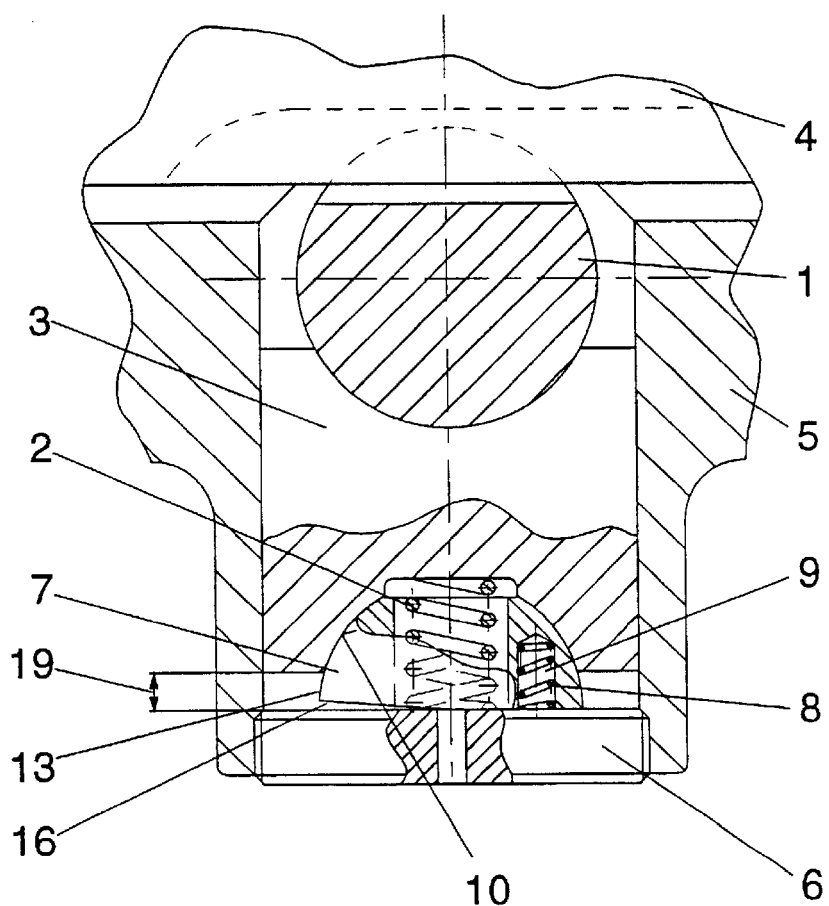
FIG. 1, a simplified section through a steering gear according to the invention.

In the drawings, in which identical elements are identified by the same reference numerals, reference numeral 1 indicates the rack of the rack-and-pinion steering gear embodied according to the invention; the rack-and-pinion steering gear is urged by a central compression spring 2 and the thrust piece 3 disposed between them toward the pinion 4 (FIG. 1). The other end of the central compression spring 2 is braced on the set screw 6 mounted in a housing 5. Between the thrust piece and the set screw, a compensating disk 7 is now provided, and in the compensating disk 7, an eccentric bore 9 is provided in which an eccentric spring 8 is disposed, which for instance is a helical compression spring.

Figure 2:
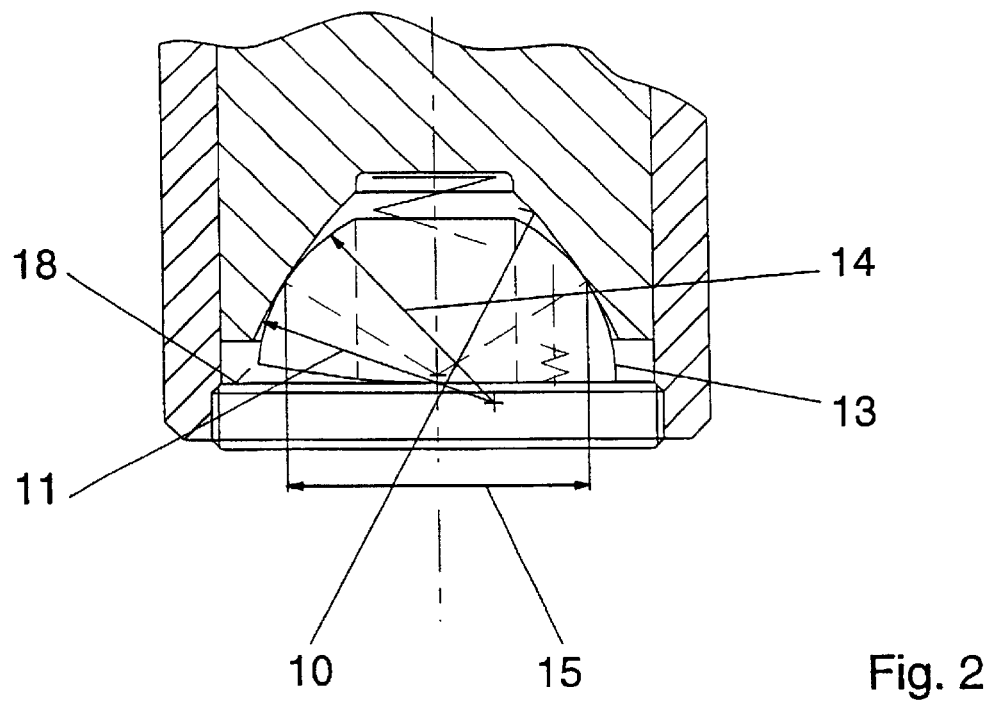
FIG. 2, one possible embodiment of the ball socket.
Figure 3:
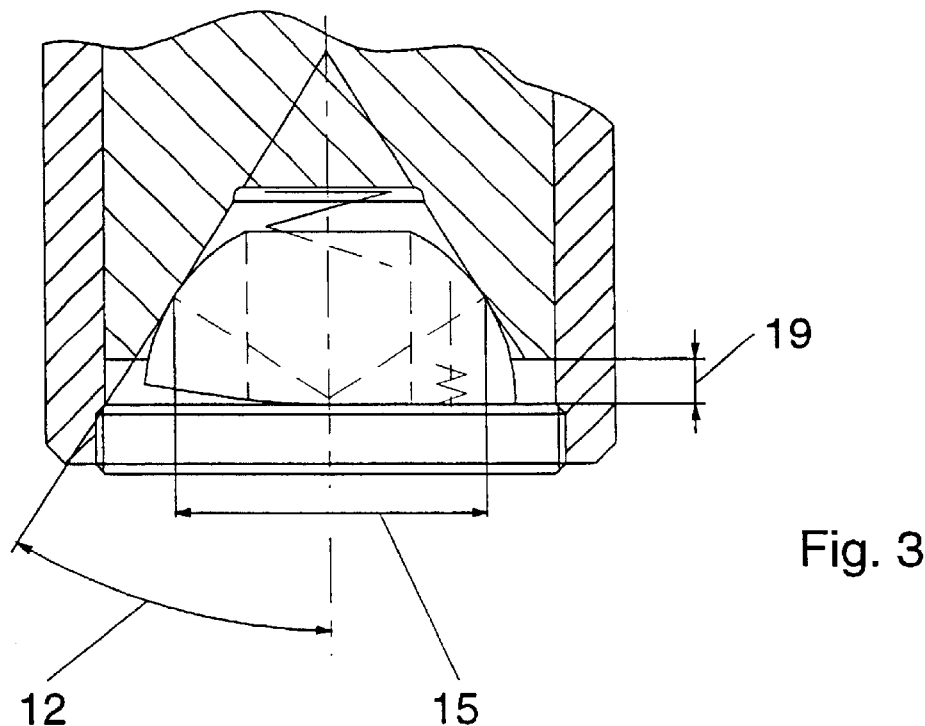
FIG. 3, a variant of the ball socket.

The top side, toward the thrust piece 3, of the compensating disk 7 is embodied in arched fashion and has for instance a ball zone 13, which engages a complementary ball socket 10 in the thrust piece 3. The ball socket radius 11 of the compensating disk can have the same dimensions as the ball zone radius 14. To compensate for production variations in the spherical form, however, it can be advantageous to make the ball socket radius somewhat larger, as shown in FIG. 2, or to lend it the form of a cone 12, as shown in FIG. 3. If one of these exemplary embodiments is employed, the size of the contact face diameter 15, as a contact point between the thrust piece and the compensating disk, and its position in the system, are designed in a targeted way. This also improves the lubricant delivery.

The backside, toward the set screw 6, on a portion that amounts to at most half of this side, has a curve-like curvature 16. The bore 9 for the eccentric spring 8 is disposed in the flat portion of the compensating disk.

As the spacing between the thrust piece and set screw increases, the eccentric spring 8, such as a compression spring, inserted into the bore 9 causes a rotation of the compensating disk by the compensating disk angle of rotation 21 shown in FIG. 5 and back again into the outset position shown in FIG. 1. In the process, the compensating disk 7 rotates on the one hand in the ball socket 10 of the thrust piece 3 and on the other, with its curved underside 16, rolls along the flat surface 18 of the set screw 6. The angle of rotation 21 of the compensating disk is shown in an exaggerated size in FIG. 5 for the sake of greater clarity. The value actually employed in practice is very much less than this, so that no functional problems will arise with regard to the two springs 2 and 8.

Figure 5:
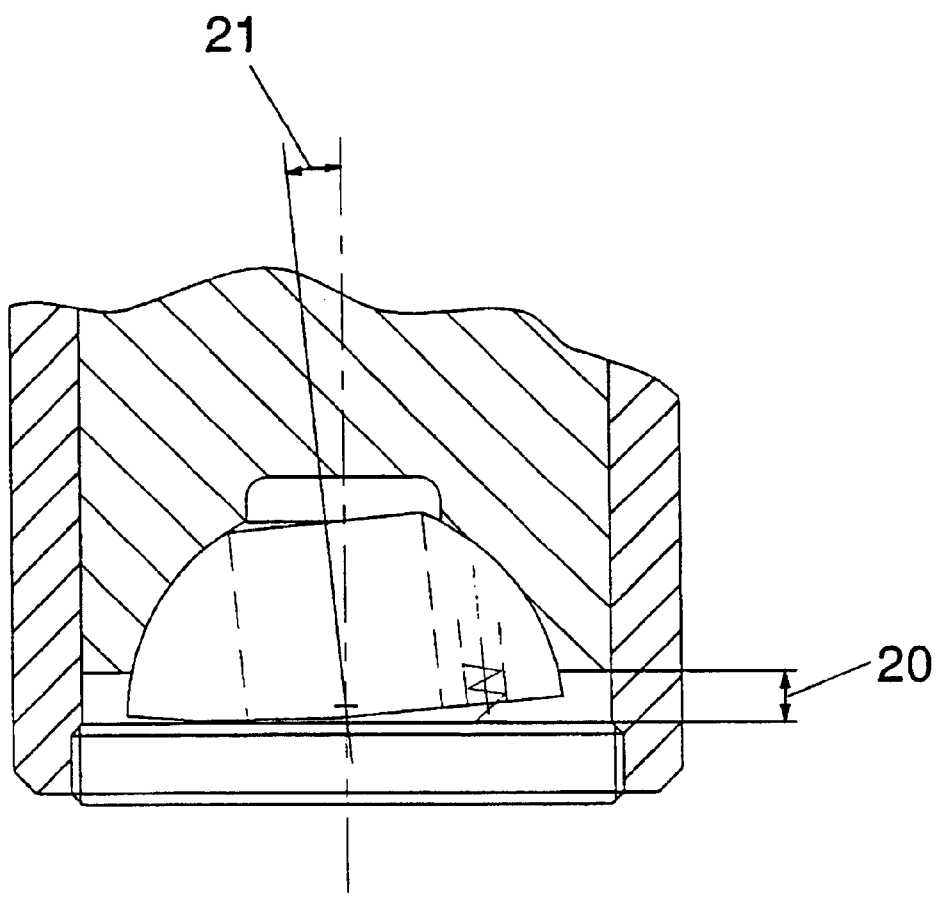
FIG. 5, the position of the thrust piece having the greatest thrust piece spacing.

In FIG. 3, the least thrust piece spacing is also shown at 19, and in FIG. 5, the greatest thrust piece spacing is shown at 20.

Figure 4:
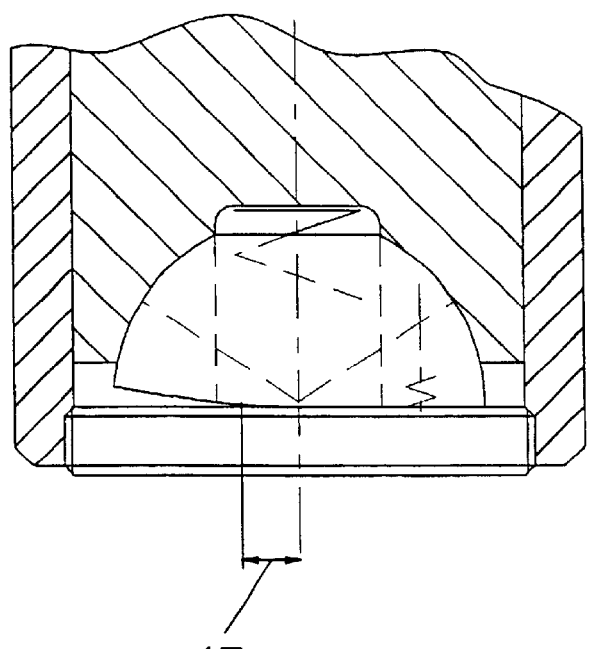
FIG. 4, a variant of the backside of the compensating disk.

If, to withstand stress caused by bumps in the road, the underside of the compensating disk should be made flat across more than half of the cross section, the result can be loads in the curved zone about a flat surface zone 17, as shown in FIG. 4, without any functional impairment.

Instead of the helical compression spring 8 shown as an example, the deflection of the compensating disk 7 to achieve the compensating disk angle of rotation 21 can also be effected by a tension spring or a spiral spring.

Figure 6:
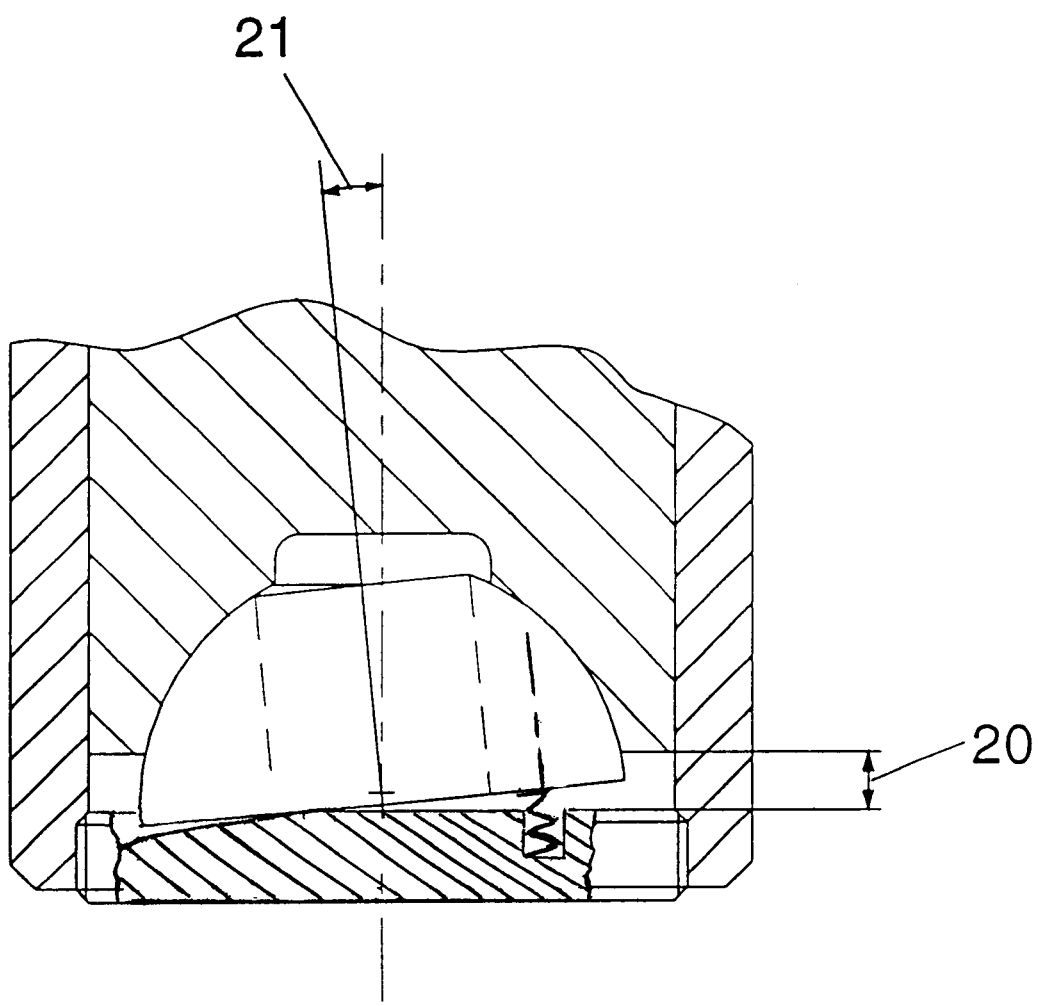
FIG. 6, another embodiment with the set screw having the curvature and with the thrust piece having the greatest thrust piece spacing.

Depending on the space available, the curvature 16, the bore 9 and the eccentric spring 6 can also be provided on the set screw 6, instead of on the compensating spring 7, as shown in FIG. 6.

LIST OF REFERENCE NUMERALS

1 Rack
2 Central compression spring
3 Thrust piece
4 Pinion
5 Housing
6 Set screw
7 Compensating disk
8 Eccentric spring
9 Bore for eccentric spring
10 Ball socket of the thrust piece
11 Ball socket radius
12 Cone
13 Ball zone of the compensating disk
14 Ball zone radius
15 Contact face diameter
16 Curve-like curvature of the underside of the compensating disk
17 Flat portion of the compensating disk
18 Top side of set screw
19 Least thrust piece spacing
20 Greatest thrust piece spacing
21 Angle of rotation of compensating disk

What is claimed is:

1. A rack-and-pinion steering gear comprising:
   a housing in which a rack and pinion of the steering gear are located;
   a thrust piece in the housing which bears forwardly against the rack, the thrust piece including a rearward ball socket;
   a set screw provided in the housing adjacent to the thrust piece;
   a central compression spring provided between the set screw and the thrust piece which urges the thrust piece and hence the rack forwardly towards the pinion;
   a compensating disk provided between the set screw and the thrust piece and having a forward ball portion which engages the ball socket of the thrust piece;
   an eccentric bore provided on one of a rearward side of the compensating disk toward the set screw or a forward side of the set screw toward the compensating disk; and
   an eccentric spring disposed in the eccentric bore and having opposite ends which respectively engage the compensating disk and the set screw.

2. The rack-and-pinion steering gear of claim 1:
   wherein the compensating disk, on its rearward side toward the set screw, has the eccentric bore; and
   wherein the eccentric spring disposed in the eccentric bore has a rearward end which engages the set screw.

3. The rack-and-pinion steering gear of claim 1:
   wherein a radius of the ball socket is greater than a radius of the ball portion of the compensating disk.

4. The rack-and-pinion steering gear of claim 1:
   wherein the ball socket of the thrust piece has the form of a cone.

5. The rack-and-pinion steering gear of claim 1, wherein the compensating disk includes a rearward convex curvature portion oriented toward the set screw.

6. The rack-and-pinion steering gear of claim 1, wherein the bore and the eccentric spring are disposed in a rearward flat portion of the compensating disk oriented toward the set screw.

7. The rack-and-pinion steering gear of claim 5, wherein the convex curvature portion has the form of an arc of a circle.

8. The rack-and-pinion steering gear of claim 5, wherein the convex curvature portion has the form of one of an ellipse or hyperbola or parabola.

9. The rack-and-pinion steering gear of claim 5, wherein a length of the curvature portion extends over half of a rearward side of the compensating disk.

10. The rack-and-pinion steering gear of claim 5, wherein a length of the curvature portion extends over less than half of a rearward side of the compensating disk, and the rearward side of the compensating disk includes a flat surface portion adjacent to the curvature portion zone.

11. The rack-and-pinion steering gear of claim 1, wherein a forward side, toward the compensating disk, of the set screw has an arched curvature portion.

12. The rack-and-pinion steering gear of claim 11, wherein the bore and the eccentric spring are disposed on a flat portion of a forward surface, oriented toward the compensating disk, of the set screw.

13. The rack-and-pinion steering gear of claim 12, wherein the arched curvature portion has the form of an arc of a circle.

14. The rack-and-pinion steering gear of claim 12, wherein the arched curvature portion has the form of one of an ellipse or hyperbola or parabola.

15. The rack-and-pinion steering gear of claim 12, wherein a length of the arched curvature portion extends over less than half of the rearward side of the set screw, and the rearward side of the set screw includes a flat surface portion adjacent to the arched curvature portion.

16. The rack-and-pinion steering gear of claim 1, wherein the eccentric spring is one of a helical compression or tension spring or a spiral spring.

17. The rack-and-pinion steering gear of claim 5, wherein by a spacing between a center point of the ball portion radius and a center point of the curvature portion, a slip-free rolling of a rear side of the compensating disk along a plane face of the set screw occurs during a change in a thrust piece spacing.

18. The rack-and-pinion steering gear of claim 11, wherein by a spacing between a center point of the ball portion radius and a center point of the curvature portion, a slip-free rolling of a plane face of the compensating disk along a front side of the set screw occurs during a change in a thrust piece spacing.

* * * * *